United States Patent
Singh (10) Patent No.: US 11,144,224 B2
(45) Date of Patent: Oct. 12, 2021

(54) LOCALITY-AWARE, MEMORY-EFFICIENT, TIME-EFFICIENT HOT DATA IDENTIFICATION USING COUNT-MIN-SKETCH FOR FLASH OR STREAMING APPLICATIONS

(71) Applicant: EMC IP HOLDING COMPANY LLC, Hopkinton, MA (US)

(72) Inventor: Sweetesh Singh, Benares (IN)

(73) Assignee: Dell Products L.P., Hopkinton, MA (US)

(*) Notice: Subject to any disclaimer, the term of this patent is extended or adjusted under 35 U.S.C. 154(b) by 252 days.

(21) Appl. No.: 16/170,112

(22) Filed: Oct. 25, 2018

(65) Prior Publication Data

US 2020/0133543 A1 Apr. 30, 2020

(51) Int. Cl.
*G06F 12/00* (2006.01)
*G06F 3/06* (2006.01)
*G06F 12/10* (2016.01)

(52) U.S. Cl.
CPC ......... *G06F 3/0634* (2013.01); *G06F 3/0604* (2013.01); *G06F 3/067* (2013.01); *G06F 12/10* (2013.01); *G06F 2212/1008* (2013.01); *G06F 2212/657* (2013.01)

(58) Field of Classification Search
CPC ...... G06F 3/0634; G06F 3/0604; G06F 3/067; G06F 3/0655; G06F 3/0683; G06F 12/10; G06F 12/0246; G06F 2212/1008; G06F 2212/657

See application file for complete search history.

(56) References Cited

U.S. PATENT DOCUMENTS 10,001,927 B1 * 6/2018 Trachtman ............ G06F 3/0665
2018/0081569 A1 * 3/2018 Kan ...................... G06F 12/121

* cited by examiner

*Primary Examiner* — Shawn X Gu
(74) *Attorney, Agent, or Firm* — Anderson Gorecki LLP (57) ABSTRACT

Extents of data are promoted or demoted between hierarchical storage tiers based on temporal locality of access captured with a primary count-min-sketch based on monitored input-output commands. Extents may also be promoted based on spatial locality of access captured with a secondary count-min-sketch based on the monitored input-output commands. The count-min-sketches may be implemented in a tiering engine of a storage array or in the flash translation layers of solid-state drives. The flash translation layers may generate tiering hints that are provided to a tiering engine.

11 Claims, 6 Drawing Sheets

LOCALITY-AWARE, MEMORY-EFFICIENT, TIME-EFFICIENT HOT DATA IDENTIFICATION USING COUNT-MIN-SKETCH FOR FLASH OR STREAMING APPLICATIONS

TECHNICAL FIELD

The subject matter of this disclosure is generally related to computer networks in which storage arrays maintain data for host applications that run on servers, and more particularly to hierarchical tiering in storage arrays.

BACKGROUND

A storage array manages access to host application data stored on non-volatile drives such as SSDs (solid-state drives) and HDDs (hard disk drives). The host application data may be accessed by multiple host servers, each of which may support multiple instances of the host application. The managed drives are not discoverable by the host servers, but the storage array creates a logical production volume that is discoverable and accessible by the host servers. The production volume has contiguous fixed-size LBAs (logical block addresses) that map to non-contiguous physical addresses of the managed drives. The host servers send IO (input-output) commands, e.g. SCSI (small computer system interface) commands, to the storage array with reference to the storage space of the production volume. The storage array uses metadata to access the corresponding storage space on the managed drives to service the IO commands.

It is known to organize the managed drives of a storage array into hierarchical tiers based on performance capabilities. For example, a tier based on SSDs might exhibit less latency than a tier based on HDDs. An extent of host application data is placed on a tier that is selected based on how frequently that extent is accessed by the host servers. More particularly, frequently accessed extents are located on a higher performing tier than infrequently accessed extents. Extents may be promoted and demoted between tiers as relative access frequency changes over time.

SUMMARY

All examples, aspects and features mentioned in this document can be combined in any technically possible way.

In accordance with an aspect, an apparatus comprises: a plurality of interconnected computing nodes, each of the computing nodes comprising at least one processor and non-transitory memory; a plurality of data storage drives on which extents of data are stored, each data storage drive connected to at least one of the computing nodes, the data storage drives being organized into a plurality of hierarchical tiers differentiated based on performance; and a tiering engine that prompts selected ones of the extents of data to be promoted or demoted between the tiers based on temporal locality of access captured with a primary count-min-sketch based on monitored input-output commands. In some implementations the tiering engine further prompts selected ones of the extents to be promoted based on spatial locality of access captured with a secondary count-min-sketch based on the monitored input-output commands. In some implementations the primary count-min-sketch maintains an access count for each accessed logical block address. In some implementations the secondary count-min-sketch maintains an access count for each of a plurality of logical block addresses within a predetermined spatial proximity to the accessed logical block addresses. In some implementations for each access to one of the accessed logical block addresses the access count of the primary count-min-sketch is incremented at a different rate than the access count of the secondary count-min-sketch. In some implementations the access counts of the primary count-min-sketch and the access counts of the secondary count-min-sketch are decremented in accordance with a decay function based on temporal proximity of access. In some implementations the access counts of the primary count-min-sketch are decremented at a different rate than the access counts of the secondary count-min-sketch. In some implementations the primary count-min-sketch is implemented in a translation layer of a solid-state drive. In some implementations the translation layer of the solid-state drive generates hints that are provided to the tiering engine.

In accordance with an aspect a method comprises: in a data storage network comprising a plurality of interconnected computing nodes, each of the computing nodes comprising at least one processor and non-transitory memory, and a plurality of data storage drives on which extents of data are stored, each data storage drive connected to at least one of the computing nodes, the data storage drives being organized into a plurality of hierarchical tiers differentiated based on performance: monitoring input-output commands; and promoting some of the extents of data between the tiers based on temporal locality of access captured with a primary count-min-sketch based on the monitored input-output commands. Some implementations comprise promoting selected ones of the extents based on spatial locality of access captured with a secondary count-min-sketch based on the monitored input-output commands. Some implementations comprise the primary count-min-sketch maintaining an access count for each accessed logical block address, and the secondary count-min-sketch maintaining an access count for each of a plurality of logical block addresses within a predetermined spatial proximity to the accessed logical block addresses. Some implementations comprise, for each access to one of the accessed logical block addresses, incrementing the access count of the primary count-min-sketch at a different rate than the access count of the secondary count-min-sketch. Some implementations comprise decrementing the access counts of the primary count-min-sketch and the access counts of the secondary count-min-sketch in accordance with a decay function based on temporal proximity of access. Some implementations comprise decrementing the access counts of the primary count-min-sketch at a different rate than the access counts of the secondary count-min-sketch. Some implementations comprise implementing the primary count-min-sketch in a translation layer of a solid-state drive. Some implementations comprise the translation layer of the solid-state drive generating hints that are provided to the tiering engine.

In accordance with an aspect an apparatus comprises: a solid-state data storage drive comprising: a physical layer comprising memory cells; and a translation layer that maps logical block addresses of input-output commands received by the solid-state drive with the memory cells, the translation layer comprising a primary count-min-sketch that monitors the input-output commands and based thereon captures temporal locality of access to extents of data stored in the memory cells and generates hints to prompt promotion of ones of the extents based on the captured temporal locality of access. In some implementations the translation layer further comprises a secondary count-min-sketch that monitors the input-output commands and based thereon captures spatial locality of access to extents of data stored in the memory cells and generates hints to prompt promotion of ones of the extents based on the captured spatial locality of access. In some implementations the translation layer generates promotion hints that are provided to a computing node connected to the solid-state data storage drive.

Other aspects, features, and implementations may become apparent in view of the detailed description and figures.

DETAILED DESCRIPTION

Aspects of the inventive concepts will be described as being implemented in a data storage system that includes a host server and storage array. Such implementations should not be viewed as limiting. Those of ordinary skill in the art will recognize that there are a wide variety of implementations of the inventive concepts in view of the teachings of the present disclosure.

Some aspects, features, and implementations described herein may include machines such as computers, electronic components, optical components, and processes such as computer-implemented procedures and steps. It will be apparent to those of ordinary skill in the art that the computer-implemented procedures and steps may be stored as computer-executable instructions on a non-transitory computer-readable medium. Furthermore, it will be understood by those of ordinary skill in the art that the computer-executable instructions may be executed on a variety of tangible processor devices, i.e. physical hardware. For ease of exposition, not every step, device or component that may be part of a computer or data storage system is described herein. Those of ordinary skill in the art will recognize such steps, devices and components in view of the teachings of the present disclosure and the knowledge generally available to those of ordinary skill in the art. The corresponding machines and processes are therefore enabled and within the scope of the disclosure.

The terminology used in this disclosure is intended to be interpreted broadly within the limits of subject matter eligibility. The terms "storage array" and "solid-state drive" are intended to include all storage nodes and storage components in which the inventive concepts may be implemented. The terms "logical" and "virtual" are used to refer to features that are abstractions of other features, e.g. and without limitation abstractions of tangible features. The term "physical" is used to refer to tangible features, including but not limited to electronic hardware. For example, multiple virtual computing devices could operate simultaneously on one physical computing device. The term "logic" is used to refer to special purpose physical circuit elements, firmware, software, computer instructions that are stored on a non-transitory computer-readable medium and implemented by multi-purpose tangible processors, and any combinations thereof.

Figure 1:
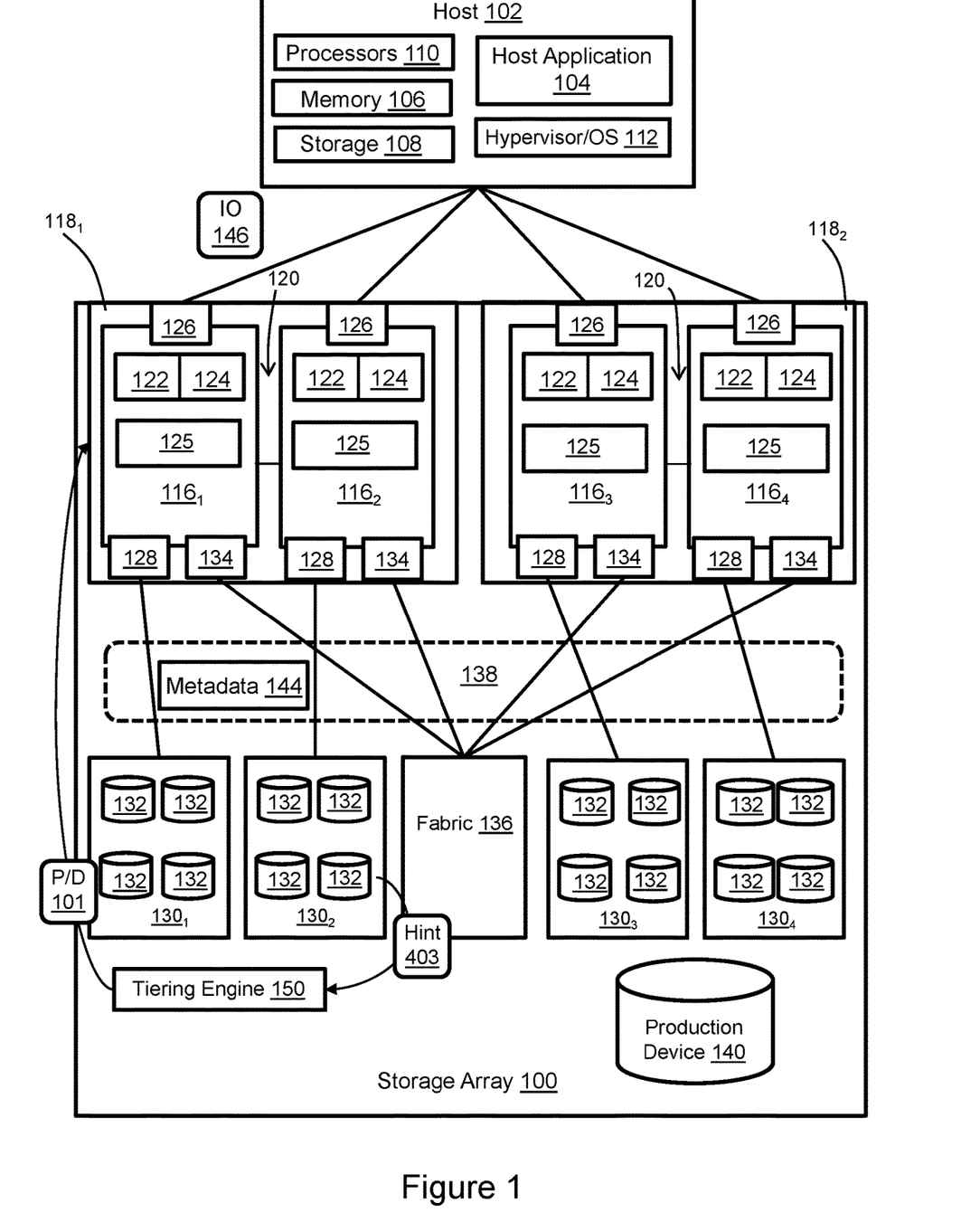
FIG. 1 illustrates a storage array in which count-min-sketches are used to monitor data access activity in support of storage tiering.

FIG. 1 illustrates a simplified computer network in which count-min-sketches are used to monitor data access activity in support of storage tiering. In the illustrated example the network includes a storage array 100 that is connected to a host 102. There would typically be multiple hosts and storage arrays in the network, but the illustrated example is simplified to facilitate understanding of salient aspects.

The host 102 may be a type of server computer that includes volatile memory 106, non-volatile storage 108, one or more tangible processors 110, and a hypervisor or OS (operating system) 112. The volatile memory 106 may include RAM (random access memory) of any type. The non-volatile storage 108 may include drives of one or more technology types, for example, and without limitation, SSDs such as flash, and HDDs such as SATA (Serial Advanced Technology Attachment) and FC (Fibre Channel). Although an external host server is illustrated, internal hosts may be instantiated within the storage array.

The storage array 100 includes a plurality of interconnected computing nodes 1161-1164 that maintain data on, and control access to, managed drives 132. Each computing node includes at least one multi-core processor 122 and local volatile memory 125. The computing nodes may also include one or more layers of cache. The local volatile memory 125 may include, for example and without limitation, components such as RAM of any type. Each computing node may also include one or more FAs 126 (front-end adapters) for communicating with the host 102. Each computing node 1161-1164 may also include one or more BAs 128 (back-end adapters) for communicating with respective associated drive arrays 1301-1304, thereby enabling access to the managed drives 132. The managed drives 132 may include tangible persistent data storage components of one or more technology types, for example, and without limitation, SSDs such as flash and SCM (storage class memory), and HDDs such as SATA and FC. Each computing node may also include one or more CAs (channel adapters) 134 for communicating with other computing nodes via an interconnecting fabric 136. Each computing node may allocate a portion or partition of its respective local volatile memory 125 to a virtual shared memory 138 that can be accessed by other computing nodes, e.g. via DMA (direct memory access) or RDMA (remote direct memory access). Pairs of the computing nodes, e.g. (1161, 1162) and (1163, 1164), may be organized as storage engines 1181, 1182, respectively, for purposes of failover between computing nodes. The paired computing nodes of each storage engine may be directly interconnected by communication links 120.

One function of the storage array 100 is to maintain data for instances of a host application 104 running on the host 102. Specifically, host application data is maintained on the managed drives 132. Examples of host applications may include but are not limited to file servers, email servers, block servers, and databases. The managed drives 132 are not discoverable by the host 102 but the storage array 100 maintains a logical production device 140 that can be discovered and accessed by the host 102. Without limitation, the production device 140 may be referred to as a production volume or production LUN, where LUN (Logical Unit Number) is a number used to identify the logical storage volume in accordance with the SCSI (Small Computer System Interface) protocol. From the perspective of the host 102, the production device 140 is a single data storage device having a set of contiguous fixed-size LBAs (logical block addresses) on which data used by instances of the host application resides. However, the host application data is stored at non-contiguous addresses on various different managed drives 132 that are abstracted by the production volume.

In order to service IOs from instances of the host application 104, the storage array 100 maintains metadata 144 that indicates, among various things, mappings between LBAs of the production device 140 and addresses with which extents of host application data can be accessed from the shared memory 138 and managed drives 132. In response to a data access instruction from an instance of the host application 104, the hypervisor/OS 112 initially determines whether the instruction can be serviced by accessing the host server memory 106. If that is not possible then an IO 146 is sent from the host 102 to the storage array 100. There are multiple paths between the host 102 and the storage array 100, e.g. one path per FA 126. The paths may be selected based on a wide variety of techniques and algorithms including, for context and without limitation, performance and load balancing. In the case of an IO to read data from the production device the storage array uses the metadata 144 to find the requested data in the shared memory 138 or managed drives 132. More particularly, if the requested data is not in the shared memory 138 then the requested data is temporarily copied into the shared memory from the managed drives 132 and used to service the IO, i.e. reply to the host application with the data via one of the computing nodes. In the case of an IO to write data to the production device the storage array copies the data into shared memory, marks the corresponding production device location as dirty in the metadata, and creates new metadata that maps the production device address with a location to which the data is eventually written on the managed drives. The shared memory may enable the production device to be reachable via all of the computing nodes and paths, although the storage array can be configured to limit use of certain paths to certain production devices.

Figure 2:
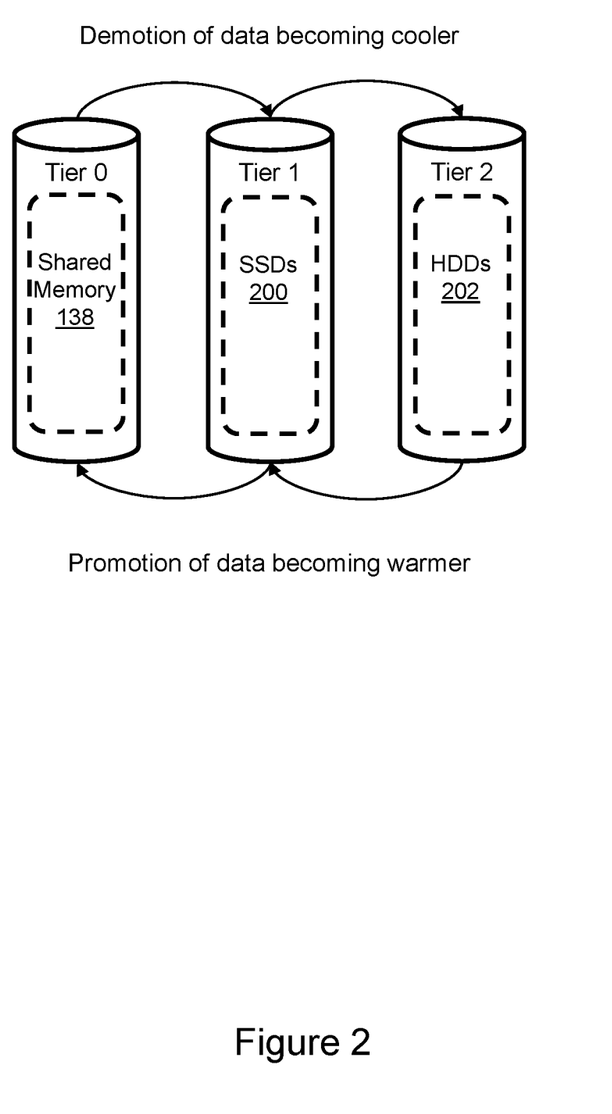
FIG. 2 illustrates aspects of data promotion and demotion implemented by the tiering engine of FIG. 1.

Referring to FIGS. 1 and 2, the storage resources of the storage array are organized into hierarchical tiers that are differentiated based on performance capabilities, e.g. in terms of IOPS (input-output operations per second) that can be serviced. In the illustrated example there are three tiers (tier 0, tier 1, and tier 2), but this should not be viewed as limiting. Any number of tiers, and other storage resources inside and outside the storage array such as caches, remote tape drives, and cloud storage could be included as tiers. In the illustrated example, tier 0 is part of the shared memory 138, tier 1 is some of the SSDs 200 of the managed drives 132, and tier 2 is some of the HDDs 202 of the managed drives. Extents of data deemed likely to be accessed in the near future, i.e. "hot" extents, are placed on tier 0 because it exhibits the best access response time. Tier 1 is used to store extents that are "warm." For example, the extents deemed to be the next most likely to be accessed extents are placed on tier 1. The remaining extents are placed on tier 2.

A tiering engine 150 selects the tier on which each extent is placed, including promoting and demoting extents between tiers as they become warmer and cooler relative to other extents. The tiering engine may include one or more of software and dedicated hardware and may use the processor and memory resources of the computing nodes. One aspect of selecting a tier on which to store a particular extent of data is temporal locality. In accordance with temporal locality, recent access activity is a predictor of likelihood of near-term future access activity, and thus may justify promotion of an accessed extent to a higher tier of storage. Conversely, recent inactivity may justify demotion of an extent to a lower tier of storage. The tiering engine 150 monitors data accesses (IOs) from the host over time to capture temporal locality and, in response, generates commands 101 to prompt promotion and demotion of extents by the computing nodes.

Figure 3:
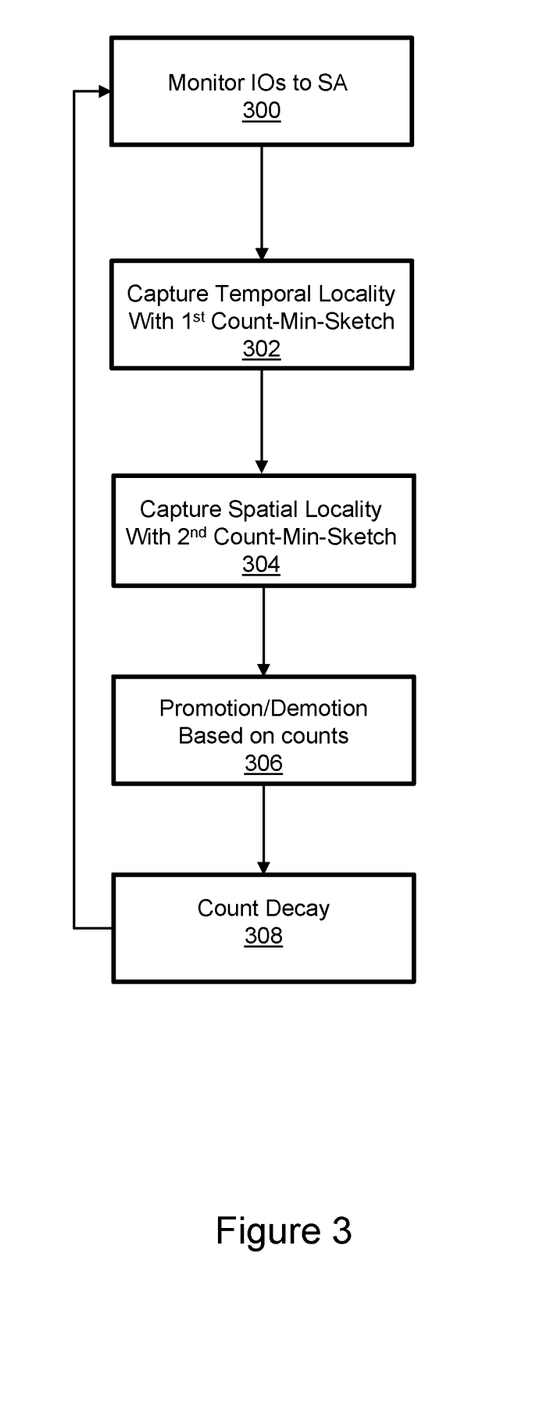
FIG. 3 is a flow diagram that illustrates operation of the tiering engine of FIG. 1.

FIG. 3 is a flow diagram that illustrates operation of the tiering engine of FIG. 1. The tiering engine monitors IOs sent to the storage array from the host as indicated in step 300. Accesses to specific production device LBAs (or LBAs of some other volume(s)) may be identified and counted with a primary count-min-sketch to capture temporal locality as indicated in step 302. The hash value of an LBA from a monitored IO is used as an index into a constant-sized array of counters. By employing several different hash functions and associated arrays, the count-min-sketch handles hash collisions that occur while querying the structure by picking the minimum value out of all relevant counters for the sample. With d pairwise independent hash functions, w hash tables, an increment operation, and a count-frequency operation the frequency of occurrence of IOs that access identified LBAs from sampled IOs can be determined and recorded by updating the data portion of the primary count-min-sketch.

A secondary count-min-sketch is optionally used to capture spatial locality as indicated in step 304. In accordance with spatial locality, access activity associated with LBAs that are near to non-accessed LBAs is a predictor that the non-accessed LBAs are likely to be accessed in the near-term. Promotion of the non-accessed but spatially proximate extents to a higher tier of storage may therefore be justified. Whenever an LBA is accessed, its neighboring LBAs (in terms of selected spatial distance) are entered in the secondary count-min-sketch. The counts for the neighboring LBAs may be incremented at a different rate than the accessed LBA, e.g. if the count for the accessed LBA in the primary count-min-sketch is incremented by n, then the counts for the spatially-close LBAs might be incremented by less than n in the secondary count-min-sketch.

Promotion and demotion commands are generated based on the counts associated with the LBAs as indicated in step 306. Existence of an LBA in both the primary and secondary count-min-sketches is a strong indicator of likelihood of future access that may prompt promotion directly to shared memory or a higher level of cache. The decisions to promote and demote extents may be based on a variety of factors, including but not limited to the storage capacities of the tiers, activity threshold values, and relative levels of access activity. One strategy is to fully utilize (e.g. to capacity minus a reserve) each tier from high to low such that utilization of higher performance/higher cost resources is emphasized. The commands are provided to the computing nodes for implementation. The computing nodes prompt data copy/movement in response to the commands. For example, extents being promoted or demoted between SSDs and HDDs are moved, whereas extents being promoted from SSDs to shared memory or cache are copied because the shared memory and cache are volatile.

A decay function is used to reduce the counts as a function of time as indicated in step 308. In some implementations the counts are reduced at a constant rate over time, e.g., c counts per unit-time. In some implementations the counts are reduced in accordance with a non-linear decay function. The decay function may be selected based on type of data, access patterns, and what kind of host applications are reading or writing the data. Application of the decay function may be temporally-limited to non-recent accesses, e.g. reducing only counts that are at least s seconds old relative to the current time. In each implementation an LBA that becomes "hot" based on increased count due to temporally proximate accesses will gradually cool if the accesses cease. The decay rate for the counts of accessed LBAs in the primary count-min-sketch may be different than for the counts of non-accessed neighbor LBAs in the secondary count-min-sketch, e.g. if the count for the accessed LBA in the primary count-min-sketch is decremented by one, then the counts for the spatially close LBAs might be decremented by a larger value, e.g. two, in the secondary count-min-sketch. The steps are iterated. Counting Bloom filters could be used in place of one or both of the count-min-sketches.

A potential advantage associated with the described tiering engine is that the primary and secondary count-min-sketches are more efficient than the algorithms and data structures typically used in prior systems for capturing data access activity. For example, the data stored by the count-min-sketches may be smaller in size for a given amount of access activity. This may be useful if the number of IOs being monitored per unit-time is large. Further, the primary and secondary count-min-sketches may require less complex logic and processing resources. As will be explained below, these advantages may enable implementation of access monitoring in the translation layer of the SSDs.

Figure 4:
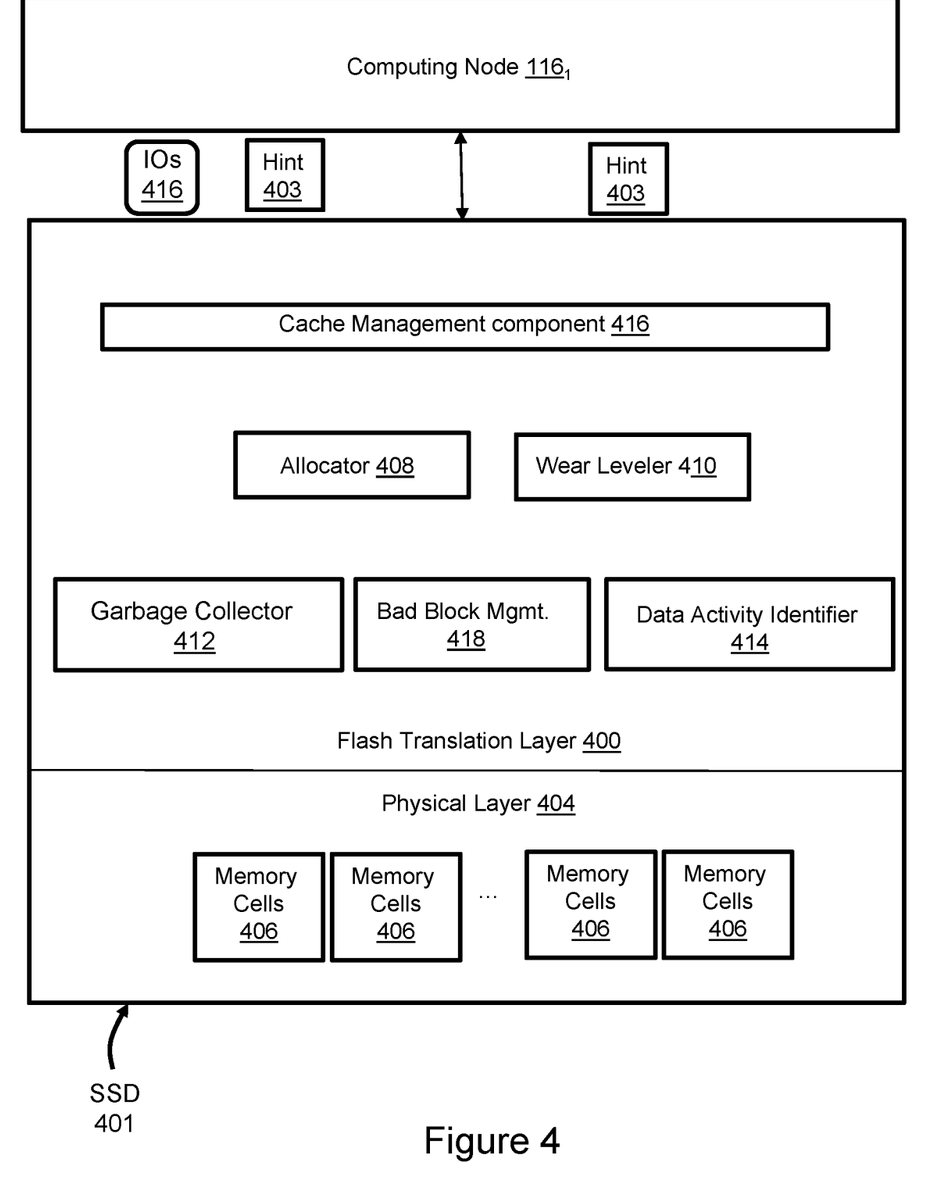
FIG. 4 illustrates a data activity identifier implemented in a translation layer of a SSD.

Referring to FIG. 4, an SSD 401, which represents one of the managed drives, implements access monitoring with count-min-sketches. The SSD 401, which is a flash drive in the illustrated example, stores data electrically in memory cells 406. The memory cells are in a physical layer 404 that is organized into pages, which are organized into blocks, which are organized into planes. Read and write operations, which are known as "program operations" with regard to flash drives, are done at the page level. Consequently, a page is the smallest unit of storage that a flash drive can process. However, previously-programmed memory cells are erased before being written, and erase operations occur at the block level. This is somewhat problematic for flash drives in general because the memory cells can only sustain a limited number of program-erase cycles before failure, and each program-erase cycle affects multiple pages. This limitation is reflected in the rated service life of a flash drive which may be expressed in terms of the number of program-erase cycles that can be sustained before failure is expected.

Figure 5:
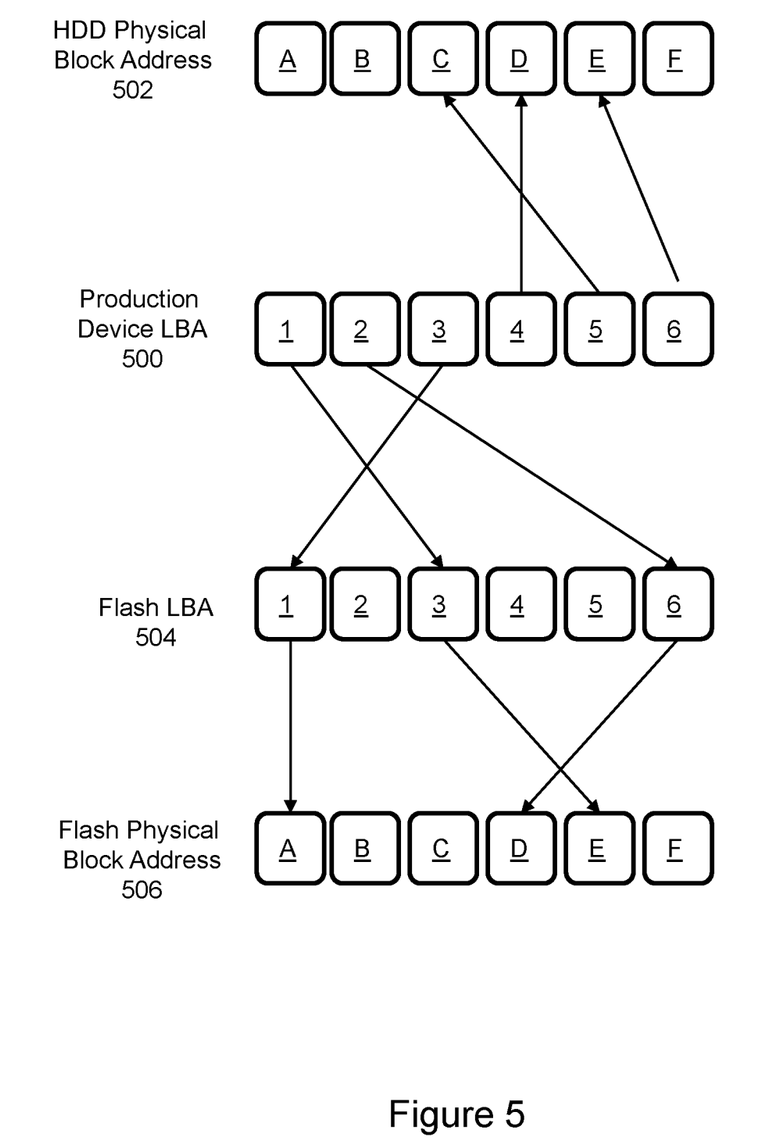
FIG. 5 illustrates layers of abstraction between the production device and physical block addresses of the SSDs and HDDs.

Referring to FIGS. 4 and 5, a translation layer such as FTL (flash translation layer) 400 abstracts the physical layer 404 from the computing node 116₁. As a result, production device LBAs 500 map to flash LBAs 504 that are managed by the FTL 400. The flash LBAs 504 map to flash physical block addresses 506 of the physical layer 404. In contrast, production device LBAs 500 may map directly to HDD physical block addresses 502. Consequently, the metadata maintained by the computing nodes of the storage array may indicate the actual physical locations of blocks of host application data on the managed HDDs, but not on the SSDs.

Abstraction enables the flash translation layer 400 to perform various useful functions that are hidden from the computing node 116₁. For example, an allocator 408 maps LBAs to physical addresses. The allocator includes logic that selectively writes updated data to new empty pages rather than erasing the pages on which the data being updated is already stored. It is generally faster, simpler, and less damaging to write updated data to an empty page than to erase and re-program the page on which the non-updated data is stored. The non-updated page is then marked as invalid and subsequent read commands are directed to the newly-programmed page. A wear leveler 410 causes selection of the newly-programmed pages to be evenly distributed across the memory cells so that the physical layer wears evenly. More particularly, pages are selected such that program-erase cycles are more evenly distributes across all physical addresses, which tends to increase the lifespan of the flash memory. Operation of bad block management 418 and a garbage collector 412 also influence wear on memory cells and benefit from input from the data activity identifier. The garbage collector 412 maintains a list of the invalid pages and manages recycling of those invalid pages, including erasing invalid pages to prepare them for reuse. Wear levelling is somewhat complicated by the relative differences in the frequency with which different blocks are accessed. For example, infrequently accessed "cold" blocks tend to cause less wear on the memory cells in which they are stored than frequently accessed "hot" blocks. Consequently, the wear leveler may prompt relocation of blocks based on access frequency in order to more evenly wear the memory cells. A data activity identifier 414 monitors IOs 416 to identify hot data and generate hints 403 that are provided to the storage array tiering engine 150 (FIG. 1). The hints 403 are indications of relative likelihood of near-future access activity associated with specific extents of data stored in the LBAs in the monitored IOs. The tiering engine is responsive to the hints 403 from the SSD to prompt movement of extents of data between performance tiers, e.g. by generating commands 101 (FIG. 1). Extents that are found to be more frequently accessed ("hotter," as indicated in a hint) are promoted to a higher performance tier and extents that are found to be less frequently accessed ("cooler," as indicated in a hint) are demoted to a lower performance tier. As will be described in greater detail below, the data activity identifier may be a count-min-sketch based component that identifies the temperature of the data and does access frequency analysis of LBAs. Because flash doesn't allow overwrites (only erase then write), and there is a limited number of erase cycles that a physical address can endure before becoming unreliable, the address allocator interacts with the data activity identifier. More particularly, because hot data is accessed and rewritten frequently, the address allocator is configured to place hot data at physical addresses having relatively low erase counts (relative to other addresses) so that wear and tear across physical addresses can be evened out. Similarly, cold data can be placed at addresses having relatively high erase counts because the chances of overwrites of cold data is low. A cache management component also interacts with the data activity identifier. Cache memory is supposed to have frequent datasets for faster performance. The data activity identifier can provide hints for the datasets that have high chances of getting hits if located in higher performing storage tiers.

HDDs do not require a similar translation layer because HDDs store data magnetically on spinning disks. The data on HDDs is arranged in concentric bands known as "tracks." Each track is organized into distinct arcuate portions known as "sectors." For context, and without limitation, the storage capacity of 1 sector may be 512 bytes, and 1 track may have 32 sectors. Due to the basic design of all HDDs, a sector may be the smallest unit of storage that a HDD can process, e.g. providing one sector of data in response to a 1 byte read or overwriting one sector of data in response to a 1 byte write. However, HDD sectors can sustain more writes than SSD pages.

Figure 6:
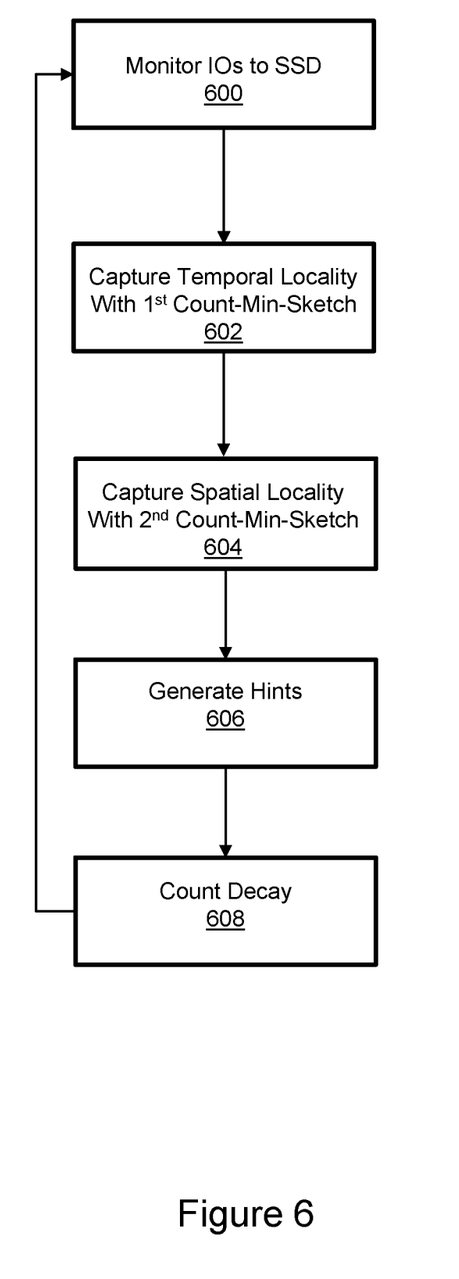
FIG. 6 is a flow diagram that illustrates operation of the translation layer data activity identifier of FIG. 4.

FIG. 6 is a flow diagram that illustrates operation of the flash translation layer data activity identifier of FIG. 4. The data activity identifier monitors IOs sent to the SSD from the computing node as indicated in step 600. Accesses to specific LBAs may be identified and counted with a primary count-min-sketch to capture temporal locality as indicated in step 602. A secondary count-min-sketch is optionally used to capture spatial locality as indicated in step 604. Promotion and demotion hints are generated based on the counts associated with the LBAs as indicated in step 606. The hints are provided to the tiering engine to prompt generation of corresponding commands that are provided to computing nodes for implementation. The computing nodes prompt data copy/movement in response to the promote/demote commands. A decay function is used to reduce the counts as a function of time as indicated in step 308. The steps are iterated, and each step may be implemented in a manner described above with regard to corresponding steps of the tiering engine.

Specific examples have been presented in order to provide context and convey inventive concepts. The specific examples are not to be considered as limiting. A wide variety of modifications may be made without departing from the scope of the inventive concepts described herein. Moreover, the features, aspects, and implementations described herein may be combined in any technically possible way. Accordingly, modifications and combinations are within the scope of the following claims.

What is claimed is:

1. An apparatus comprising:
 a plurality of interconnected computing nodes, each of the computing nodes comprising at least one processor and non-transitory memory;
 a plurality of data storage drives on which extents of data are stored, each data storage drive connected to at least one of the computing nodes, the data storage drives being organized into a plurality of hierarchical tiers differentiated based on performance; and
 a tiering engine that:
  prompts selected ones of the extents of data to be promoted or demoted between the tiers based on temporal locality of access captured with a primary count-min-sketch based on monitored input-output commands, wherein the primary count-min-sketch maintains an access count for each accessed logical block address; and
  prompts selected ones of the extents to be promoted based on spatial locality of access captured with a secondary count-min-sketch based on the monitored input-output commands, wherein the secondary count-min-sketch maintains an access count for each of a plurality of logical block addresses within a predetermined spatial proximity to an accessed logical block address.

2. The apparatus of claim 1 wherein for each access to an accessed logical block address the access count of the primary count-min-sketch is incremented at a different rate than the access count of the secondary count-min-sketch.

3. The apparatus of claim 1 wherein there are a plurality of access counts and the access counts of the primary count-min-sketch and the access counts of the secondary count-min-sketch are decremented in accordance with a decay function based on temporal proximity of access.

4. The apparatus of claim 3 wherein the access counts of the primary count-min-sketch are decremented at a different rate than the access counts of the secondary count-min-sketch.

5. The apparatus of claim 1 wherein the primary count-min-sketch is implemented in a translation layer of a solid-state drive.

6. The apparatus of claim 5 wherein the translation layer of the solid-state drive generates hints that are provided to the tiering engine.

7. A method comprising:
 in a data storage network comprising a plurality of interconnected computing nodes, each of the computing nodes comprising at least one processor and non-transitory memory, and a plurality of data storage drives on which extents of data are stored, each data storage drive connected to at least one of the computing nodes, the data storage drives being organized into a plurality of hierarchical tiers differentiated based on performance:
  monitoring input-output commands;
  promoting some of the extents of data between the tiers based on temporal locality of access captured with a primary count-min-sketch based on the monitored input-output commands;
  the primary count-min-sketch maintaining an access count for each accessed logical block address;
  promoting selected ones of the extents based on spatial locality of access captured with a secondary count-min-sketch based on the monitored input-output commands, the secondary count-min-sketch maintaining an access count for each of a plurality of logical block addresses within a predetermined spatial proximity to accessed logical block addresses; and
  for each access to one of the accessed logical block addresses, incrementing the access count of the one of the accessed logical block addresses of the primary count-min-sketch at a different rate than the access count of the one of the accessed logical block addresses of the secondary count-min-sketch.

8. The method of claim 7 comprising decrementing the access count of the one of the accessed logical block addresses of the primary count-min-sketch and the access count of the one of the accessed logical block addresses of the secondary count-min-sketch in accordance with a decay function based on temporal proximity of access.

9. The method of claim 8 comprising decrementing the access count of the one of the accessed logical block addresses of the primary count-min-sketch at a different rate than the access count of the one of the accessed logical block addresses of the secondary count-min-sketch.

10. The method of claim 7 comprising implementing the primary count-min-sketch in a translation layer of a solid-state drive.

11. The method of claim 10 comprising the translation layer of the solid-state drive generating hints that are provided to a tiering engine.

* * * * *